United States Patent [19]

Karasik et al.

[11] Patent Number: 5,708,243
[45] Date of Patent: Jan. 13, 1998

[54] MULTI-POSITION, MULTI-DIRECTIONAL ELECTRIC SWITCH MECHANISM

[75] Inventors: Vladimir Karasik; Boris Karasik, both of Walled Lake, Mich.

[73] Assignee: United Technologies Automotive, Inc., Dearborn, Mich.

[21] Appl. No.: 766,961

[22] Filed: Dec. 16, 1996

[51] Int. Cl.$^6$ .................................................... H01H 25/00
[52] U.S. Cl. ................................. 200/61.54; 200/61.27
[58] Field of Search ......................... 200/4, 17 R, 18, 200/6 R, 6 A, 61.27, 61.3, 61.31, 61.32, 61.33, 61.35, 61.36, 61.38, 61.54

[56] References Cited

U.S. PATENT DOCUMENTS

| | | | |
|---|---|---|---|
| 3,581,276 | 5/1971 | Newman | 340/52 |
| 4,315,117 | 2/1982 | Kokubu et al. | 200/61.27 |
| 4,599,501 | 7/1986 | Migrin | 200/156 |
| 4,613,733 | 9/1986 | Migrin et al. | 200/5 R |
| 4,762,967 | 8/1988 | Burdick | 200/50 C |
| 4,769,518 | 9/1988 | Burdick | 200/153 J |
| 4,814,563 | 3/1989 | Migrin et al. | 200/260 |
| 4,885,434 | 12/1989 | Vultaggio et al. | 200/4 |
| 4,891,475 | 1/1990 | Wiersing et al. | 200/5 R |
| 4,900,946 | 2/1990 | Williams et al. | 307/10.1 |
| 5,030,802 | 7/1991 | Noro | 200/61.27 |
| 5,120,914 | 6/1992 | Kerner et al. | 200/61.54 |
| 5,140,111 | 8/1992 | Vultaggio et al. | 200/4 |
| 5,196,659 | 3/1993 | Neubauer | 200/61.27 |
| 5,264,821 | 11/1993 | Vultaggio et al. | 338/172 |
| 5,385,067 | 1/1995 | Wiersing et al. | 74/484 R |
| 5,389,754 | 2/1995 | Muller et al. | 200/292 |
| 5,440,085 | 8/1995 | Suzuki et al. | 200/61.54 |
| 5,491,311 | 2/1996 | Muscat et al. | 200/4 |

*Primary Examiner*—Michael L. Gellner
*Assistant Examiner*—Michael A. Friedhofer
*Attorney, Agent, or Firm*—Dickinson, Wright, Moon, Van Dusen & Freeman

[57] ABSTRACT

A multi-position, multi-directional switch mechanism that provides switch actuation in multiple directions using opposing detent mechanisms. The multi-position, multi-directional switch mechanism has a sleeve that pivots within a base and an operator that pivots within the sleeve. Each of the pivoting members has a detent mechanism to maintain the pivotal members in a selected position. The spring loaded detents of the detent mechanisms are linearly opposing. The resulting multi-position, multi-directional switch mechanism achieves better functionality with fewer parts.

20 Claims, 6 Drawing Sheets

MULTI-POSITION, MULTI-DIRECTIONAL ELECTRIC SWITCH MECHANISM

BACKGROUND OF THE INVENTION

The invention generally relates to the art of electric switch actuators. More particularly, the invention relates to a multi-position, multi-directional electric switch actuator utilizing opposing detent mechanisms to maintain the actuator in a selected position.

Bi-directional electric switch actuator assemblies are relatively common, especially in the automotive industry. A popular example is the headlamp and turn signal lever switch typically mounted along the steering column of a vehicle. These lever switches incorporate actuator assemblies that are capable of pivoting in two linear directions 90° apart from each other. The movement of the lever in this manner provides actuation of up to four different functions. Heretofore, a typical actuator assembly having this capability would be configured from a pivoting handle and actuator. The actuator would pivot within a casing and have a pair of outwardly extending arms generally forming a semi-circle. A spring loaded detent finger is affixed upon the outwardly directed end of each arm of the actuator for engagement with an adjacent pair of detent formations formed within the outer casing of the assembly. The handle pivots in two mutually perpendicular directions within the actuator and has proximate with the inwardly directed end one or more spring loaded detent fingers that engage one or more detent formations formed within the body of the actuator.

The problem with these conventional switches is that the numerous parts in the actuator assemblies are manufactured to within specific manufacturing tolerances and the interconnection of the various parts each have specified clearances. The combined effect of the multiple tolerances and clearances in these conventional actuator assemblies results in switches having excess play and reduced accuracy. In addition, the overall size of these actuator assemblies needs to be quite large to accommodate the quantity and arrangement of these parts. Finally, the presence of multiple parts reduces reliability and necessitates extraneous assembly operations.

Accordingly, there is a need for a multi-position electric switch mechanism that: is compactly packaged, contains fewer parts, can be cost effectively produced and assembled, and provides a more precise operation and a crisper feel.

SUMMARY OF THE INVENTION

The multi-position switch mechanism of the present invention provides an actuator having multiple detented positional movements in multiply independent linear directions with opposing detent mechanisms. The detent mechanisms are aligned with the independent positional movements of the actuator. The actuator is capable of being independently positioned along any of the defined linear directions without regard to the position of the actuator in any of the other defined directions. The actuator assembly will typically be employed in an electric switch to actuate multiple switch points coinciding with the positional movements of the actuator assembly. Therefore, the switch can activate any selected switch point in a first direction at the same time that it is activating any selected switch point in any of the other directions.

DETAILED DESCRIPTION OF THE INVENTION

Figure 1:
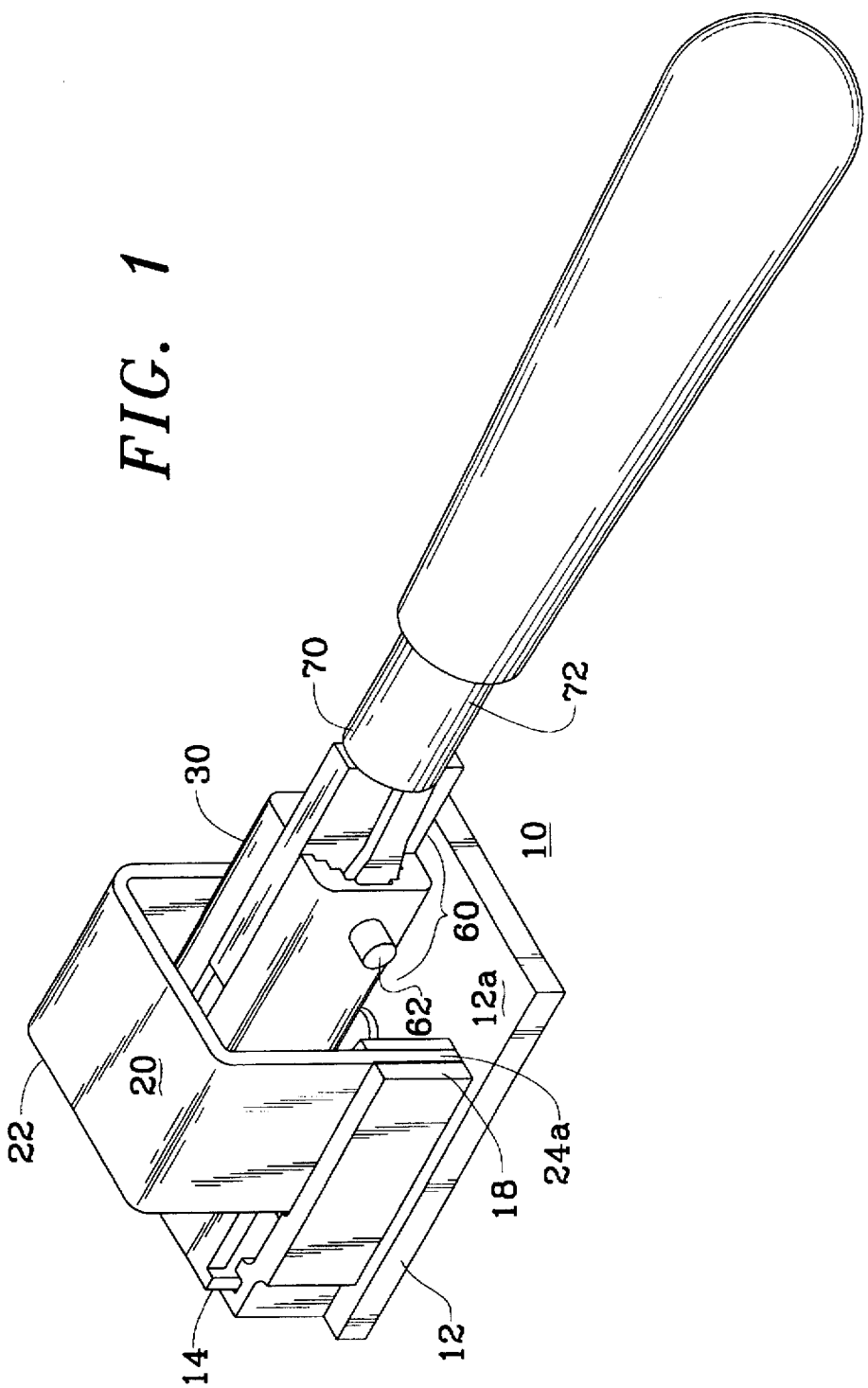
FIG. 1 is a perspective view of an actuator in accordance with a preferred embodiment of the present invention.

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

For purposes of this application, a detent mechanism will be understood to consist of a detent formation, a detent and a yielding member. The function of a detent mechanism is to releasably maintain the detent and a member attached thereto in a selected position relative to the detent formation.

The detent formation is a surface having defined areas, typically indentations, that are capable of receiving and retaining a portion of the detent. The detent formation may assume a wide variety of configurations including for example a planar, a linear or conical surface or the like having at least one defined area. Typically, the detent formation will have a plurality of defined areas in the form of notches arranged at an approximately fixed distance from a point defining the movement of the detent. Preferably, the detent formation will comprise a series of notches substantially aligned along an edge of a planar surface.

The yielding member may be any element suitable for the purpose of providing sufficient resiliency to one or both members of the mechanism such as a spring, cushion, flexible sheet, or the like. The yielding member provides a force that urges one or both of these elements against the other. Preferably, the yielding member is a spring that urges the detent against the undulating surface of the detent formation and sufficiently forces the detent into engagement with a selected defined area to maintain the detent in the selected position.

The detent may be any element suitable for releasably engaging a defined area on the detent formation. Typically, a detent will be a finger, prong, dog, pawl or other similar element. Preferably, the detent is a spring loaded finger that slides and/or rolls along the undulating surface of the detent formation.

The defined areas on the detent formation, the detent and the yielding member should all be selected to cooperatively form a detent mechanism that can be manually moved to a selected pre-defined position and releasably maintained in the selected defined area. The detent mechanism should be capable of being readily released from the selected defined area by applying a sufficient force on either the detent or the detent formation to cause the detent to release from the maintained position. In the preferred detent mechanism, the detent will be a spring loaded finger that reciprocates, in a substantially perpendicular direction with respect to the undulating surface of the detent formation, to maintain contact with the detent formation as it is moved about the surface thereof.

Figure 2:
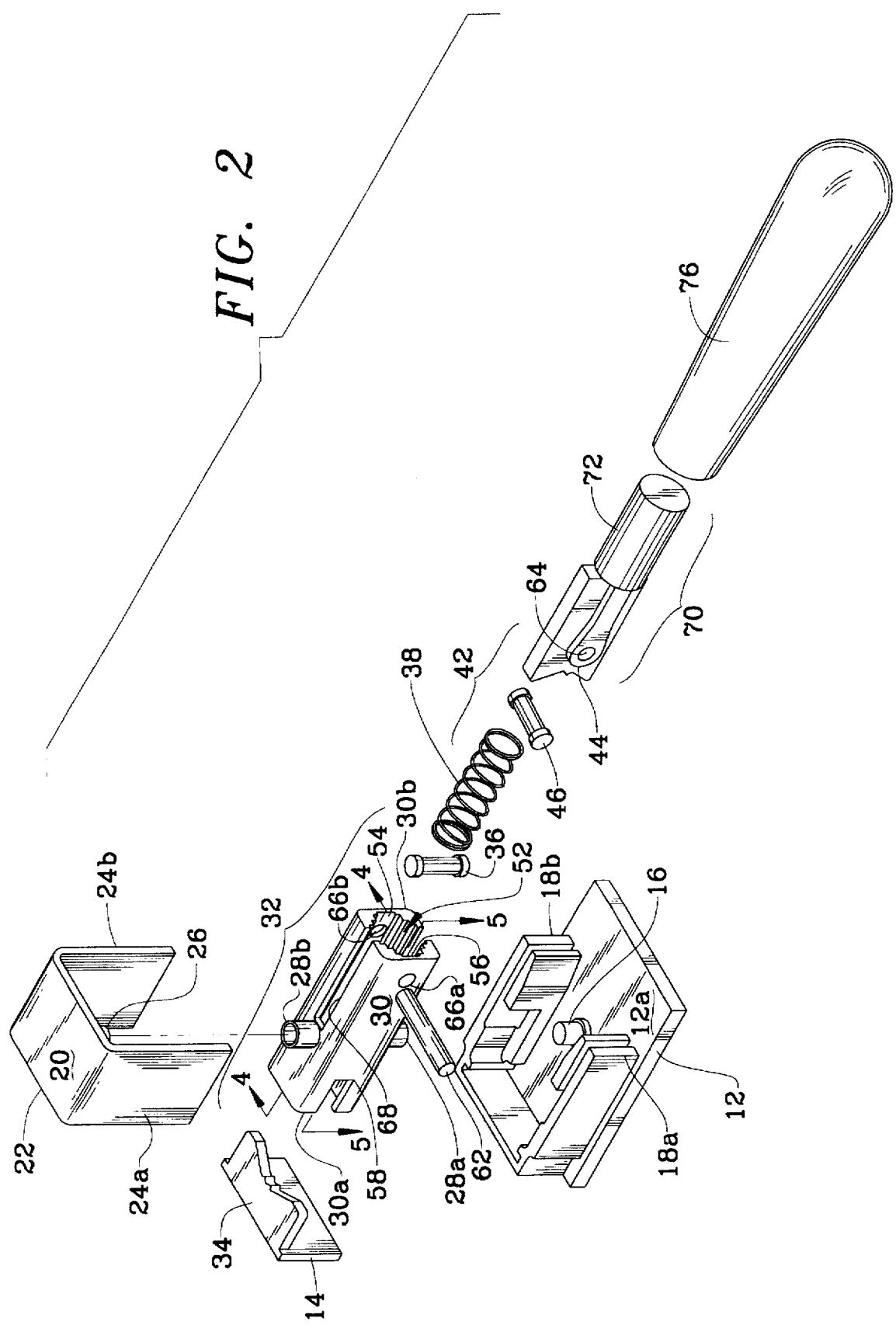
FIG. 2 is an exploded perspective view of the actuator depicted in FIG. 1.

FIGS. 1-2 depict an actuator in accordance with a preferred embodiment of the invention designed to be part of an electric switch (not shown). The actuator in accordance with the invention may, of course, be designed for use with a wide variety of electric switches and switch components. The actuator 10 comprises a base 12, a sleeve 30, an operator 70 and two oppositely arranged detent mechanisms 32 & 42.

The base 12 has a support 14 extending substantially perpendicularly from the upper surface 12a of the base. Extending inwardly, toward the center of the base, from the support is a detent formation 34 in a substantially parallel orientation above the base. In addition, the base 12 has a protruding post 16 extending upwardly from about the middle of the upper surface 12a of the base 12. In proximity to the side edges of the base, there are a pair of protruding slotted members 18(a&b) mounted on either side of the protruding post extending from the upper surface 12a of the base.

The base has a U-shaped cover 20 consisting of a horizontal member 22 extending between two opposed vertical legs 24(a&b). The horizontal member has a protruding post 26 extending downwardly, in the same direction as the vertical legs, from about the middle of the inner surface of the horizontal member 22. The U-shaped cover is mounted on the base by inserting the distal end of the legs 24(a&b) into the pair of protruding slotted members 18(a&b) on the base. The slotted members and legs can be designed so that the cover snaps into the slotted members to interlockingly attach to the base. When the cover 20 is mounted on the base the protruding posts 16 & 26 will be directed toward each other in a substantially coaxial alignment.

Figure 4:
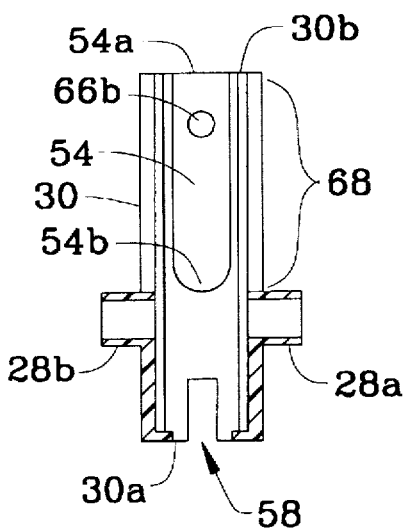
FIG. 4 is a cross-sectional view taken along line 4—4 in FIG. 2.
Figure 5:
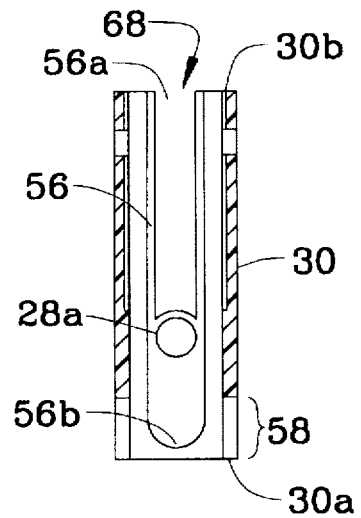
FIG. 5 is a cross-sectional view taken along line 5—5 in FIG. 2.

The sleeve 30 has an opening 52 extending through the sleeve for receiving and enclosing a pair of detent rollers 36 & 46 and a spring 38. The shape and dimensions of the sleeve will be dictated by the specific application. In the preferred embodiment depicted in FIGS. 1-2, the sleeve is uniformly square in cross-section and has an opening extending along its longitudinal centerline. On the interior of the sleeve, there are formed two perpendicularly arranged pairs of opposing grooves in the form of raceways 54 & 56, as shown in FIGS. 4 & 5 and reference is now made to those FIGS. These raceways are both open on the same end 54a & 56a, and closed on the opposite end 54b & 56b. Each of the raceways 54 & 56 are designed to receive a detent roller. A detent roller is designed to slide freely within these raceways 54 & 56 which may extend substantially the length of the sleeve 30. The raceways may be two different sizes but are preferably the same size for accommodating identically sized detent rollers.

The detent rollers 36 & 46 can be inserted into the raceways 54 & 56 from the open end but are retained within the raceway by the closed end. The closed end of the raceways are proximate with a first end 30a of the sleeve 30.

The spring 38 is sized to readily fit within the opening 52 in the sleeve 30. The spring may be longitudinally uniform or progressively varied depending on the requirements of the detent mechanisms in a particular application. The spring 38 is retained within the sleeve 30 at the first end 30a by a first detent roller 36 positioned against the closed end of the raceway 56 (see discussion below). The spring 38 is bounded on the other end by a second detent roller 46 positioned in the sleeve after the spring 38.

On the exterior of the sleeve 30, there are a pair of oppositely arranged embossments 28(a&b). These embossments 28(a&b) are designed to cooperate with the protruding posts 16 & 26 on the base and U-shaped cover to form a pivot connection between the sleeve 30 and the base 12. This pivot connection defines the plane in which the sleeve ends move. Specifically, the ends of the sleeve will move in an arcuate path within a plane perpendicular to the axis of the pivot connection.

Aligned with the planar movement of the sleeve ends, there is a slot 58 across the first end 30a of the sleeve that extends inwardly along a portion of the sleeve. This slot 58 is sized to enable the detent formation 34 attached to the base 12 to slide into the sleeve and contact the detent roller 36. Preferably, the slot 58 and detent formation 34 will be cooperatively sized and arranged so that the sleeve 30 can be pivoted relatively easily through a limited pre-determined range while contact is maintained between the detent formation 34 and the detent roller 36.

The second end 30b of the sleeve, opposite the first end, has a pivot joint 60 for the operator. The pivot joint 60 has an axis perpendicular to the axis of the sleeve pivot connection. The operator pivot joint 60 consists of a pivot pin 62 that is inserted transversely through the sleeve. Preferably, the pivot pin 62 will extend perpendicularly through the sleeve.

The operator 70 has a handle 72 on one end and on the opposing end a detent formation 44. The operator 70 has at an intermediate point between the detent formation 44 and the handle 72 an opening 64 for engaging the pivot pin 62. The operator 70 is preferably joined to the sleeve 30 by inserting the pivot pin through a hole 66a on one side of the sleeve, the opening 64 in the operator and a hole 66b in the opposing side of the sleeve 30 to form the pivot joint 60. This pivot joint 60 defines the plane through which the detent formation 44 on the end of the operator 70 moves.

Figure 3:
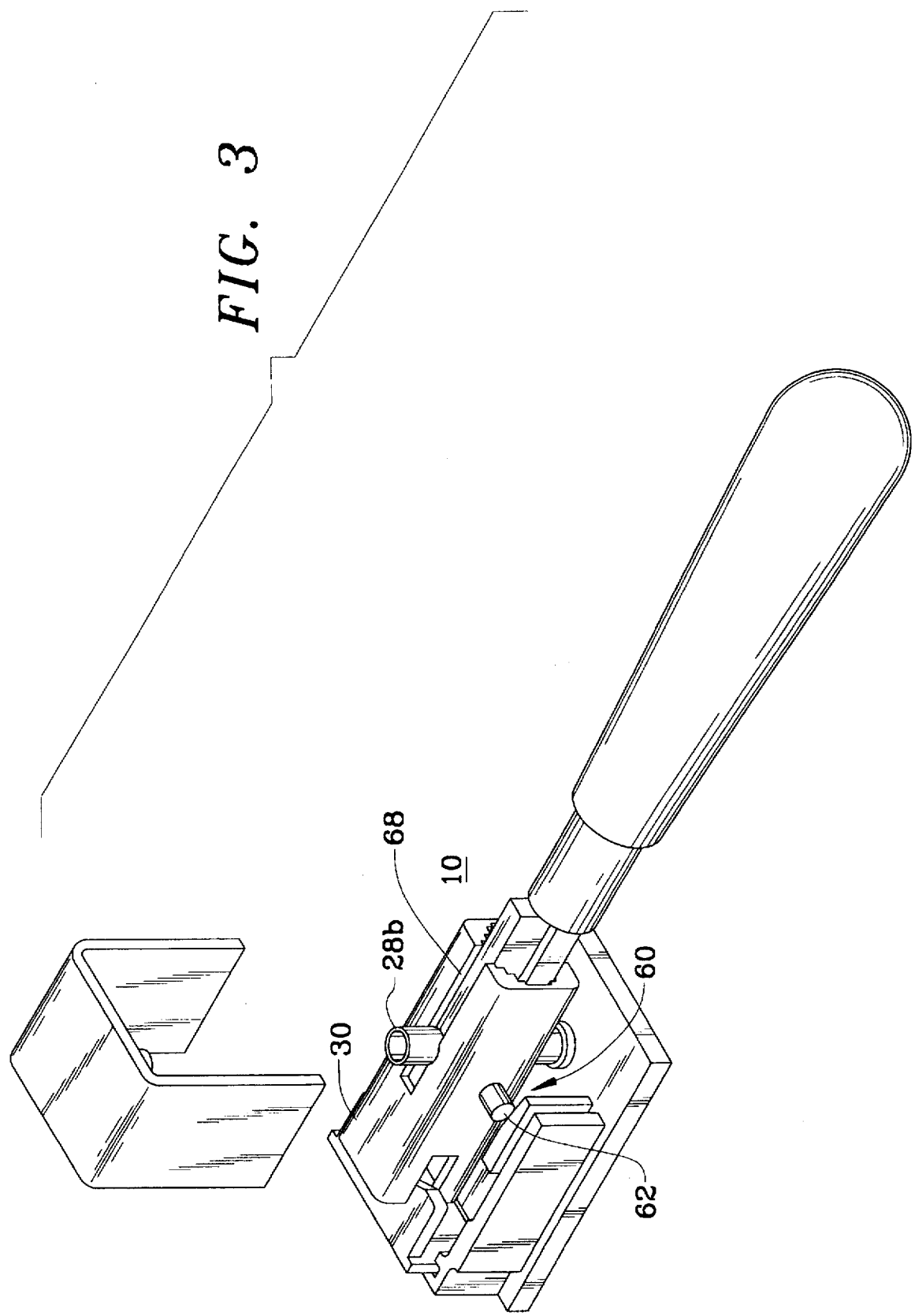
FIG. 3 is a partially exploded perspective view of an another preferred embodiment of the present invention.

The pivot connection for the sleeve and the pivot joint for the operator can be independently located along the sleeve to conform with the design parameters of a particular application. In FIG. 3, the pivot joint 60 for the operator 70 and the pivot connection for the sleeve 30 are positioned on the sleeve so that the axes of these pivot points perpendicularly intersect.

Similar to the first end 30a, the second end 30b of the sleeve has a slot 68, aligned with the planer motion of the operator, extending across the end of the sleeve that extends inwardly along a portion of the sleeve. This slot 68 is sized to allow portions of the operator 70 to move beyond the interior of the sleeve during pivotal movement of the operator.

The sleeve 30, spring 38, detent rollers 36 & 46, operator 70 and pivot pin 62 form a sub-assembly. The sub-assembly can be assembled by inserting a first detent roller 36 into the open end of the raceway 56, at the second end 30b of the sleeve, so that is will be held parallel to the axis of the sleeve pivot connection. The spring 38 is then inserted into the sleeve with a first end in contact with the first detent roller 36. The second detent roller 46 is positioned against the exposed second end of the spring and within the raceway 54 in the sleeve so that it will be parallel with the axis of the operator pivot joint 60. The detent formation end of the operator 70 is inserted into the second end 30b of the sleeve in a manner so that the detent formation transversely engages the second detent roller 46 and the opening 64 in the operator will align with the holes 66(a&b) in the sleeve. The detent formation end of the operator 70 is pushed against the second detent roller 46 which in turn compresses the spring 38 as it is inserted further into the sleeve 30. The operator is inserted to the point where the opening 64 in the operator is aligned with the holes 66(a&b) in the sleeve. The pivot pin 62 is inserted through the holes to pivotally join the operator 70 to the sleeve 30 and hold the sub-assembly together. The resulting assembly holds the first and second detent rollers within the sleeve with a linear outwardly directed force exerted on both rollers by the compressed spring held therebetween.

The sub-assembly is pivotally mounted on the base 12 by inserting the base mounted detent formation 34 into the slot on the first end 30a of the sleeve and the protruding post 16 on the base 12 into one of the embossments 28a on the exterior of the sleeve 30. The protruding post 26 on the U-shaped cover 20 is placed into the exposed embossment 28b on the sleeve and the legs 24(a&b) of the cover are inserted into the protruding slots 18(a&b) on the base. Optionally, an extension handle 76 is attached to the handle 72 on the operator.

In operation, the spring urges these linearly opposing first and second detent rollers against the base mounted detent formation and the detent formation on the end of the operator, respectively. As the handle is moved causing movement about the sleeve pivot connection, the first detent roller moves in and out as it passes across the base mounted detent formation. Similarly, as the handle is moved in a perpendicular direction resulting in motion about the operator pivot joint, the second detent roller will move up and down within the raceway to accommodate the undulating surface of the handle mounted detent formation.

A typical use for this multi-position, multi-directional actuator would be in an electric switch for turn signal and headlight beam selection in a vehicle. Although the design of the actuator can be modified to suit a particular application, the actuator can readily be designed to accommodate these functions by having one detent formation with three notches defining the left, neutral and right positions, respectively, for operation of the turn signal. The other detent formation, preferably associated with the pivotal motion of the operator, will have two notches defining the high and low beam positions for operation of the headlights.

Figure 6:
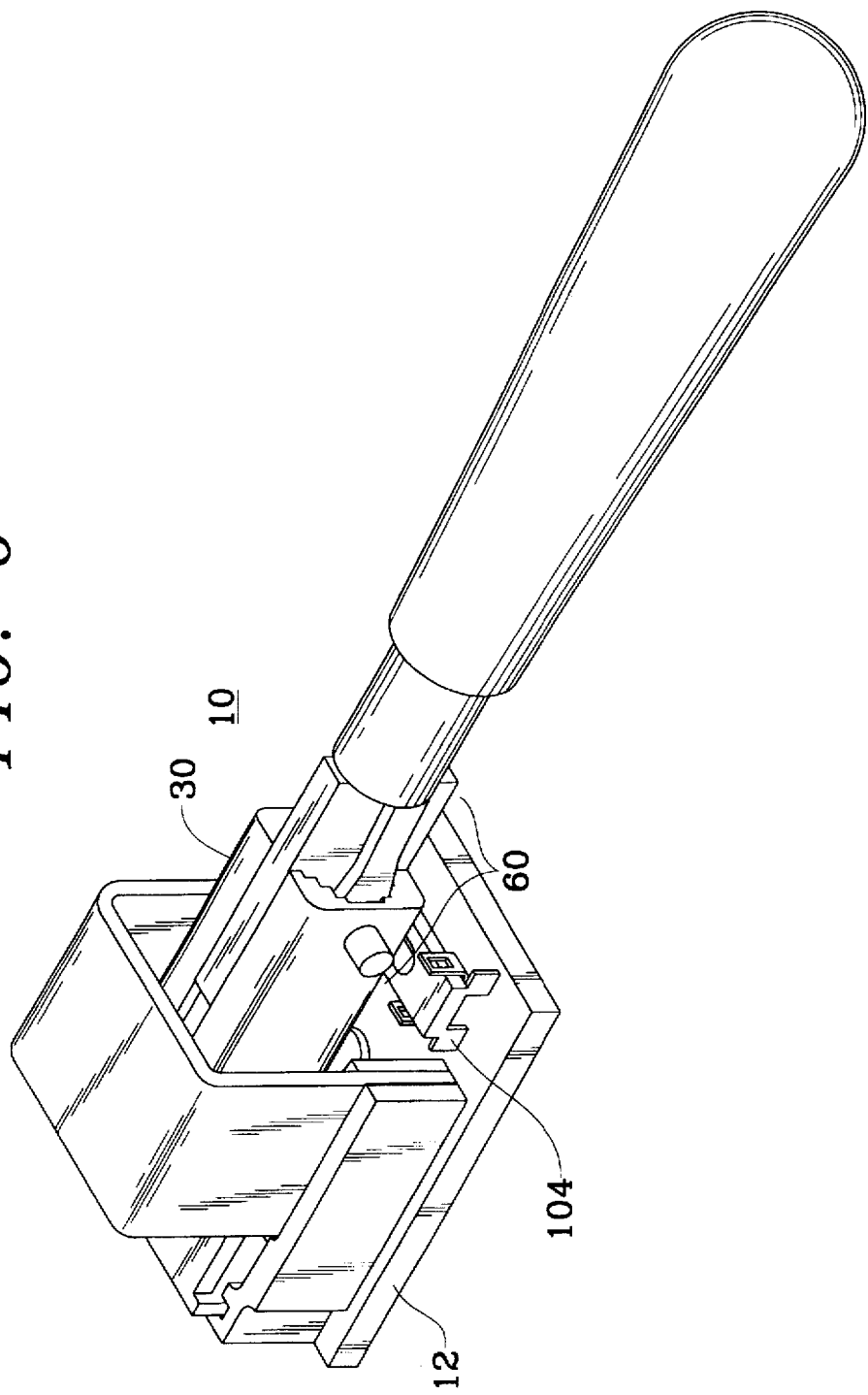
FIG. 6 is a perspective view of an exemplary electric switch in accordance with the present invention.
Figure 7:
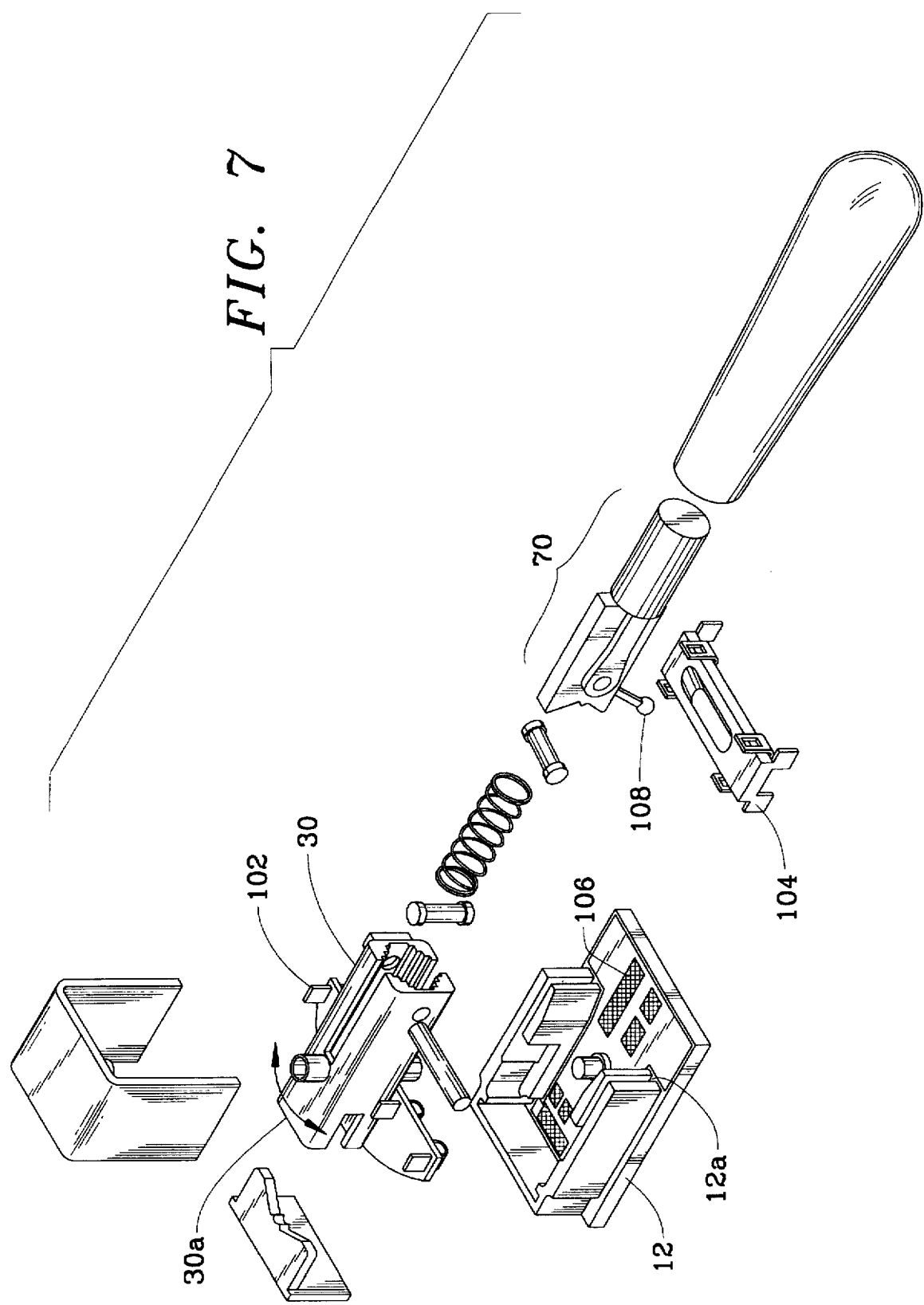
FIG. 7 is an exploded perspective view of the electric switch depicted in FIG. 6.

The actuator can be equipped with electrical contactors by any one of a number of techniques. The contactors will preferably be arranged to sense the independent bi-directional movements of the actuator. FIGS. 6 & 7 depict an exemplary method of equipping the actuator of FIG. 1, discussed above, with electrical contactors.

In FIGS. 6 & 7, the actuator 10 is fitted with two sets of contactors. A first set of contactors 102 is attached to the sleeve 30, along the side directed toward the base 12, proximate with the first end 30a of the sleeve. A second set of contactors 104 is positioned in proximity to the detent formation 44 on the operator 70 between the sleeve 30 and the upper surface 12a of the base 12. The upper surface 12a of the base 12 is equipped with an array of copper contact strips or traces 106 that cooperate with the first and second set of contactors 102 & 104.

The first set of contactors 102 are actuated by the pivotal motion of the first end 30a of the sleeve. The second set of contactors 104 are responsive to the pivotal motion of the operator 70 about the pivot joint 60. The second set of contactors 104 are mechanically linked to the operator 70 by a finger 108 extending from therefrom. Depending on the application, the electrical contactors may be of different designs but are preferably the same to reduce the number of different component parts in the switch assembly.

Figure 8:
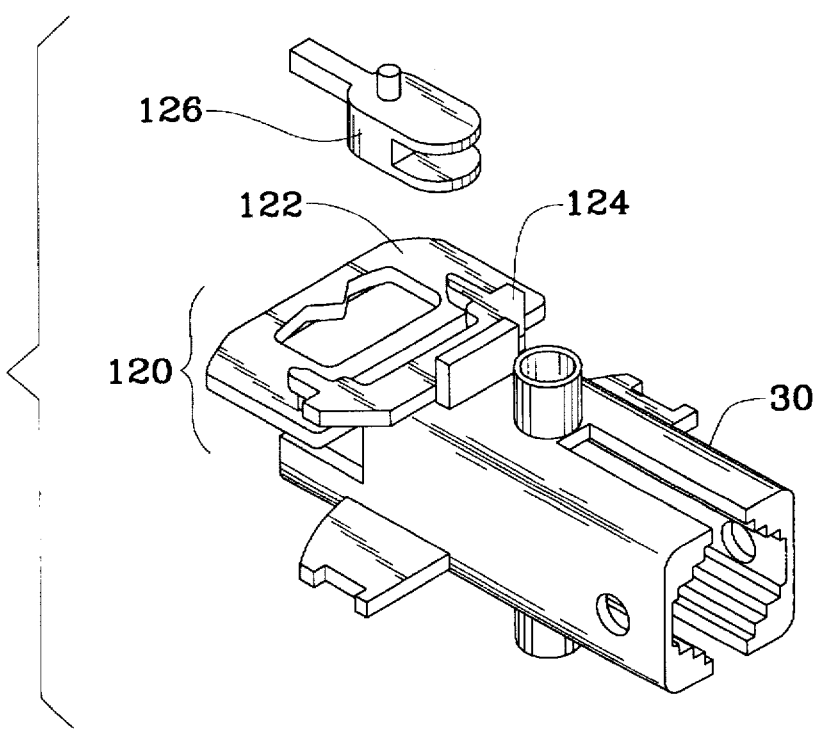
FIG. 8 is a perspective view with a turn signal cancellation mechanism mounted on the sleeve portion of the switch depicted in FIG. 6, shown by itself.

FIG. 8 depicts the sleeve 30 of the actuator fitted with an optional turn signal cancellation mechanism 120. The turn signal cancellation mechanism 120 comprises a base member 122, a movable cam 124, and a cancel pawl 126. The cancel pawl 126 is mechanically linked to the steering column (not shown). The base member 122 is rigidly affixed to the sleeve 30. The movable cam 124 is movably attached to the sleeve 30. The cancel pawl 126, base member 122, and movable cam 124 cooperate with each other to transfer sufficient force from the return movement of the steering column to release the actuator from a selected turn signal position.

What is claimed is:

1. A multi-position switch mechanism comprising:

a base;

first selector means for pre-defined positioning with respect to said base, said selector means pivotally mounted to said base, wherein said base and said first selector means cooperate to form a first detent means for releasably maintaining said first selector means in a selected position relative to said base;

second selector means for pre-defined positioning with respect to said first selector means, said second selector means pivotally mounted to said first selector means, wherein said second selector means and said first selector means cooperate to form a second detent means for releasably maintaining said second selector means in a selected position relative to said first selector means;

operator means for moving said first and second selector means, said operator means being attached to said second selector means; and wherein said first and second detent means are oppositely directed.

2. The actuator in accordance with claim 1 wherein said first and second detent means are linearly opposing.

3. The actuator in accordance with claim 2 wherein said first and second detent means are perpendicularly oriented with respect to each other.

4. The actuator in accordance with claim 1 wherein said first and second selector means pivot in different directions.

5. The actuator in accordance with claim 1 wherein said first and second selector means pivot in mutually perpendicular directions.

6. The actuator in accordance with claim 1 wherein said first and second detent means share a common yielding means.

7. The actuator in accordance with claim 6 wherein said yielding means is a spring.

8. The actuator in accordance with claim 1 wherein said operator means is capable of manual operation.

9. The actuator in accordance with claim 1 wherein said first selector means is mounted within said base and said second selector means is mounted within said first selector means.

10. A multi-position switch actuator comprising:

a base having a first detent formation;

a sleeve pivotally mounted to said base, said sleeve comprising a first detent and a second detent;

an operator pivotally mounted to said sleeve for manipulating said sleeve with respect to said base, said operator comprising a second detent formation; and wherein said first detent interfaces with said first detent formation and said second detent interfaces with said second detent formation.

11. The actuator in accordance with claim 10 wherein said first detent formation and said second detent formation are mutually perpendicularly oriented.

12. The actuator in accordance with claim 10 wherein said first detent and said second detent are oppositely directed.

13. The actuator in accordance with claim 10 wherein said first detent and said second detent reciprocate along the same line.

14. The actuator in accordance with claim 10 wherein said first detent and said second detent have a common yielding member.

15. The actuator in accordance with claim 14 wherein said yielding member is a spring.

16. The actuator in accordance with claim 10 wherein said first and second detents and a yielding member are enclosed within said sleeve.

17. The actuator in accordance with claim 10 wherein said second detent formation extends from an end of said operator.

18. The actuator in accordance with claim 17 wherein said operator further comprises a handle extending oppositely from said second detent formation and said second detent formation maintains said first and second detents and a yielding member within said sleeve.

19. The actuator in accordance with claim 10 wherein said first detent releasably engages said first detent formation and said second detent releasably engages said second detent formation.

20. A multi-position, multi-directional electric switch comprising:

a base having a first detent formation;

a sleeve pivotally mounted to said base, said sleeve enclosing a first detent, a second detent and a spring;

an operator pivotally mounted to said sleeve for manipulating said sleeve with respect to said base, said operator comprising a second detent formation;

a first set of electrical contactors operatively attached to said sleeve;

a second set of electrical contactors operatively attached to said operator; and wherein said first detent releasably engages said first detent formation, said second detent releasably engages said second detent formation, said first detent formation and said second detent formation are mutually perpendicularly oriented, said first and second detents are oppositely directed, reciprocate along the same line and are forced outwardly by a common spring.

* * * * *